UNITED STATES PATENT OFFICE.

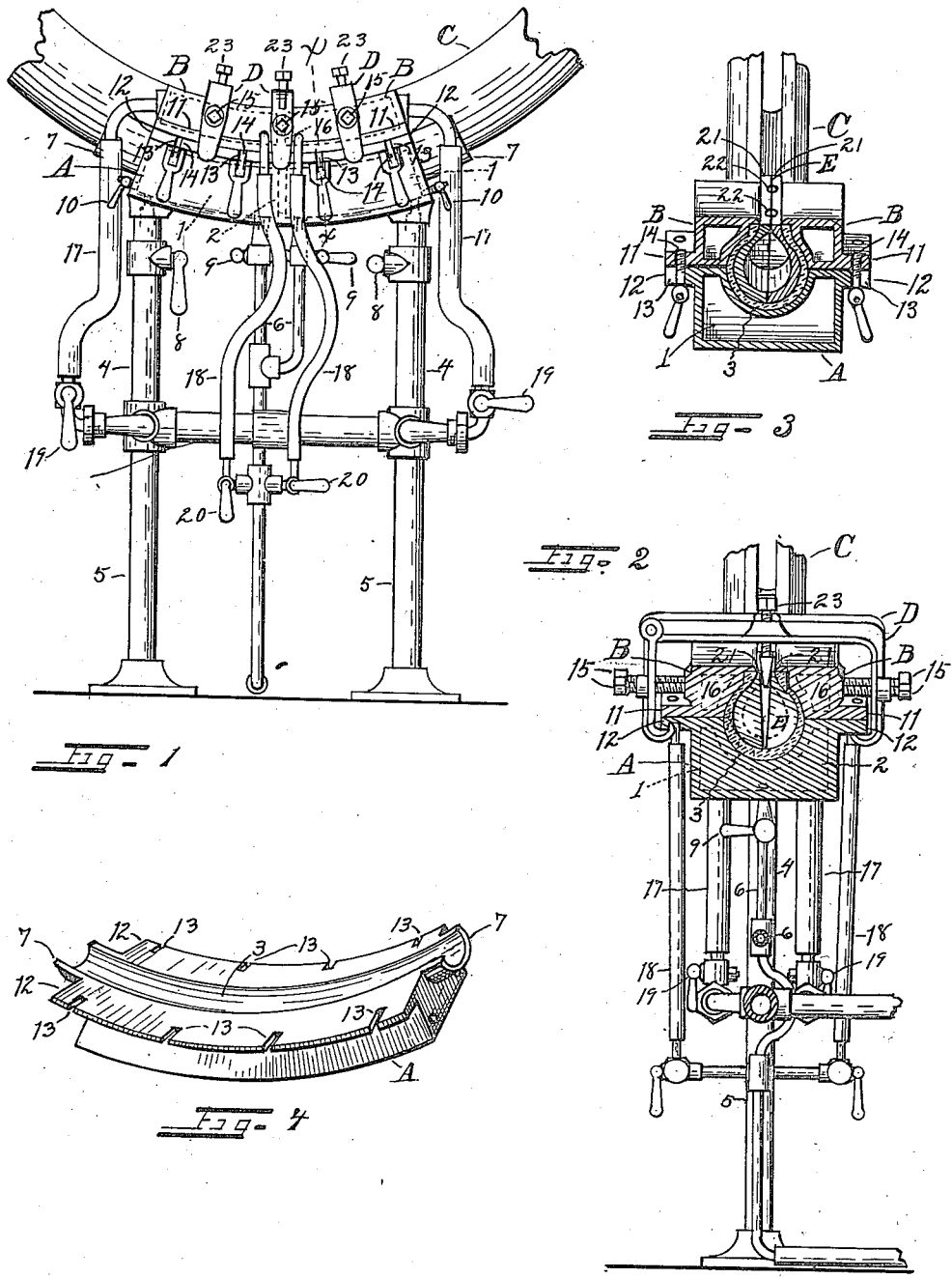

CHARLES A. WILLEY, OF BATTLE CREEK, MICHIGAN.

VULCANIZING DEVICE.

1,162,535.  Specification of Letters Patent.  Patented Nov. 30, 1915.

Application filed February 20, 1915. Serial No. 9,746.

*To all whom it may concern:*

Be it known that I, CHARLES A. WILLEY, a citizen of the United States, residing at Battle Creek, in the county of Calhoun and State of Michigan, have invented certain new and useful Improvements in Vulcanizing Devices, of which the following is a specification.

This invention relates to improvements in vulcanizing devices whereby rubber tires, tire casings and the like may be retreaded, patched and otherwise acted on, and other rubber articles vulcanized.

In carrying out the present invention it is my purpose to provide a vulcanizing device whereby the tire casing or other article to be acted upon may be vulcanized rapidly and effectively and without wrinkling or otherwise mutilating the tire, and whereby the side wall of the tire may be patched and the periphery retreaded simultaneously.

It is also my purpose to provide a device of the class described which will hold the tire or other article being acted upon securely during the vulcanizing process, and whereby flowing of the rubber during the vulcanizing process will be prevented.

Furthermore, I aim to improve and simplify the general construction of vulcanizers of this class, and to provide a device which may be manufactured, marketed and operated at a minimum of expense, and whereby one section of the tire or other article within the vulcanizer may be vulcanized without affecting the adjacent portion or section within the vulcanizer.

With the above and other objects in view, my invention consists in the construction, combination and arrangement of parts hereinafter set forth in the specification and defined in the appended claims.

In the drawings forming a part of this specification, Figure 1 is a side elevation of my improved vulcanizer with a section of a pneumatic tire casing fitted therein preparatory to vulcanizing. Fig. 2 is a central transverse sectional view of the same. Fig. 3 is a transverse, sectional view of the vulcanizing bowl, the supplemental side vulcanizing sections, a tire casing and the sectional core for securing tire, on the line *x*—*x* of Fig. 1. Fig. 4 is a perspective view of the vulcanizing bowl.

Like marks of reference refer to corresponding parts in the different views, in which "A" represents the vulcanizing bowl which in the present instance is curved longitudinally to conform to the curvature of the shoe or casing of the tire. This bowl "A" is a hollow inclosed shell divided transversely into at least two compartments or fluid chambers 1—1, separated by a partition 2, the upper wall of the bowl forming a curing cavity 3 extending longitudinally of the bowl and curved in cross section to correspond with the transverse section of the shoe or tire casing.

Adjacent to the outer ends of the bowl are ports to which are connected fluid supply pipes 4, respectively, which in this instance also form the upper terminal of legs 5 for supporting the bowl, and formed in the bowl at opposite sides of the partition 2 are ports with which are connected discharge pipes 6, respectively.

In the present instance the opposite ends of the bowl "A" are formed with outwardly-extending flanges 7 corresponding in cross-sectional configuration to the wall of the curing cavity 3, of which they are a part. These flanges extending away from the bowl are subject to air currents outside of the heat zone thereof for the purpose of giving the tire a uniformly smooth surface at the juncture with the patch. The pipes 4 and 6 are equipped with controlling valves 8 and 9, respectively.

In practice, the portion of the tire casing to be vulcanized is placed in the cavity 3, and the valve 8 in the supply pipe 4 opened and the valve 9 in the discharge pipe 6 closed. The supply pipes 4 are connected with a suitable source of steam and as the valve therein has been opened, as described, the steam enters the chamber 1 to the right separated by the partition 2 of the bowl, thereby heating the bowl and the rubber in the tire or casing fitted therein. The cavity 3 in the upper wall of the bowl is of such depth as to nicely receive the tread portion of a tire or casing when the same is in the curing cavity, and when subjected to the action of the heat from the steam in the chamber the tire may be patched, retreaded or otherwise treated. Succeeding the vulcanizing process, the valve in the supply pipe is closed and the valve in the discharge pipe opened, thereby releasing the pressure in the chamber to which the tire has been subjected for vulcanizing and permitting the water of condensation to drain off. That the flow of steam may be readily determined in the chambers 1—1, and that water from condensation may as readily be drawn from the bowl, small pet cocks 10 are fitted at either end thereof.

In order that the sides of the tire casing may be vulcanized simultaneously with the retreading thereof, I employ supplemental side vulcanizing sections B—B, curved longitudinally and disposed at the opposite sides of the portion of the tire casing within the cavity 3 of the bowl. Each section "B" is hollow, and the inner wall thereof is formed in such manner as to lie in face to face contact with the adjacent side wall of the tire casing and receive the clencher portion of the tire casing. In the present instance the lower longitudinal surfaces of the respective sections "B" have outwardly-extending flanges 11, which together with their convex surfaces rest upon the concave surfaces of the bowl "A" and flanges 12 projecting from either upper side thereof. That the supplemental side vulcanizing sections "B" may be readily attached to or detached from the bowl "A", the flanges 12 are provided with a series of side opening slots 13 through which the shanks of screw-threaded clamping bolts 14 screw-threaded into said sections "B" may be fitted.

Spanning the tire "C" and extending over the supplemental vulcanizing sections "B," are the detachable clamping yokes D which engage under the flanges 12 of the bowl "A". Threaded through the respective limbs of the clamping yokes are clamping screws 15 designed to engage the outer walls of the sections "B", respectively, to hold the latter into engagement with the tire casing. Each section "B" is formed centrally with a cross partition 16, substantially in like manner to the partition 2 of the bowl "A", as it divides the section into two chambers, and formed in one wall of each section "B" at the outer ends thereof are inlet ports, respectively, with which are connected flexible supply pipes 17, while formed in such wall of the sections at opposite sides of the partition 16 are discharge ports with which are connected flexible discharge pipes 18, and located in the pipes 17 and 18 are valves 19 and 20 respectively.

"E" is a core designed to fit into the tire casing being vulcanized, to hold the side walls and tread of the casing against the bowl cavity 3 and the inner side walls of the sections "B", respectively. This core is curved longitudinally to conform to the curvature of the tire casing and is of a cross sectional shape corresponding to the cross sectional configuration of the tire casing, and is preferably of two longitudinal sections 21 having the confronting faces thereof formed with the registering partitions formed with companion wedge-shaped grooves 22 to receive wedge-pointed screws 23, whereby the sections 21 of the core may be expanded and bind the tire tightly within the cavity 3 and the sections "B." When the sections "B" are in position against the respective sides of the tire and held against the tire by means of the clamping bolts 14 and the side screws 15 of the yokes, the wedge screws 23 of the yokes expand the core section "E" against the inner wall of the tire. The valve 19 in the supply pipe 17 being open and the valve 20 in the discharge pipe 18 closed, the steam flows into the chambered portion of the section "B" to the right and heats the adjacent walls of the tire whereby such walls may be patched, it being understood that said patch or patches or portion of tread is to be prepared and adjusted to the tire within the vulcanizer preparatory to treating by heat. Succeeding the vulcanizing operation the valve 19 in the supply pipe 17 is closed and the valve 20 in the discharge pipe 18 opened, thereby relieving the steam pressure in the chamber of the section "B" and draining out the water.

To those skilled in the art to which this invention appertains, it will be readily apparent that the side vulcanizing sections "B" may be detached from the vulcanizing bowl "A" and the tread of a tire, only, be vulcanized in the bowl cavity 3 by means of the core "E", the clamping yokes D and their adjustable screws 23, or equivalent.

By means of my improved vulcanizing device, it will be seen that the tire may be retreaded and the side walls of the tire patched and the clencher flanges of the tire vulcanized or treated at one and the same time if necessary, and at the same time be held within the vulcanizer so that wrinkling or other mutilation of the tire will be eliminated.

While I have herein shown and described the preferred form of my improved vulcanizer, I wish it to be understood that I do not limit or confine myself to the exact details of construction herein described and set forth, as various modifications could be resorted to without departing from the spirit and intent of my invention.

From the foregoing description, taken in connection with the drawings, it is believed a more extended explanation of the workings and advantages of my invention will not be necessary.

Having, therefore, set forth my invention, what I claim as new and desire to secure by Letters Patent, is:

1. In a vulcanizing device for tire casings and the like, a bowl having a curing cavity therein to receive the tire and of a depth sufficient to accommodate the tread of said tire, an encompassing wall spaced apart therefrom to form a fluid space adapted to receive the heating fluid, and supplemental sections disposed at opposite sides of said tire above said bowl and resting upon the latter and having the inner walls thereof formed to receive the side walls of said tire and the clencher edges thereon, said sections being hollow to receive a heating fluid.

2. In a vulcanizing device for tire casings and the like, a bowl having a curing cavity therein to receive the tire and of a depth sufficient to accommodate the tread of the tire, an encompassing wall spaced apart therefrom to form a fluid space adapted to receive a heating fluid, supplemental sections disposed at the opposite sides of said tire above said bowl and resting upon the latter and having the inner walls thereof formed to receive the side walls of said tire and the clencher edges thereof, said sections being hollow to receive the heating fluid, and means detachably connected with said bowl for clamping said sections against said tire.

3. In a vulcanizing device for tire casings and the like, a bowl having a curing cavity therein to receive the casing and of a depth sufficient to accommodate the tread of said tire, an encompassing wall spaced apart therefrom to form a space adapted to receive a heating fluid, supplemental vulcanizing sections disposed at the opposite sides of said tire above said bowl and seated on the latter and having the inner walls thereof formed to receive the side walls of the tire and the clencher edges thereon, and a core within the particular portion of said tire in said cavity and coöperating with the inner walls of the bowl curing cavity and said vulcanizing sections to prevent wrinkling of said tire.

4. In a vulcanizing device for tire casings and the like, a bowl having a curing cavity therein to receive said tire and of a depth sufficient to receive the tread of said tire, an encompassing wall spaced apart therefrom to form a fluid chamber adapted to receive the heating fluid, supplemental vulcanizing sections disposed at the opposite sides of said tire above said bowl and seated upon the latter and having the inner walls thereof formed to receive the side walls of said tire and the clencher edges thereon, said sections being hollow to receive a heating fluid, a core within the particular portion of said tire in said cavity and coöperating with the inner walls of said bowl cavity and sections to prevent wrinkling of said tire, said core comprising two sections, and means for expanding said sections.

5. In a vulcanizing device for tire casings and the like, the combination with a bowl comprising a tire-curing cavity with a surrounding chamber adapted to receive the heating fluid, flanges having open-ended slots at either side of said curing cavity on said bowl, supplemental vulcanizing sections disposed on either side of said cavity and seated upon said bowl and having flanges coöperating with the flanges of said bowl, adjusting screws fitted within the flanges of said sections and adapted to engage through said slots in the flanges of said bowl, a longitudinally and vertically divided sectional core adapted to be received within the curing cavity of said bowl and between the inner walls of said sections, clamping members spanning said core and sections and having limbs adapted to engage the flanges of said bowl, screws coöperative through threaded apertures in said limbs and engaging the outer walls of said vulcanizing sections, and a screw coöperating through the threaded aperture in a clamping member above said core and coöperating therewith to expand said core against a tire or casing fitted within the curing cavity of said bowl and between said sections, substantially as, and for the purpose set forth.

CHARLES A. WILLEY.

Witnesses:
  E. D. ALBERTSON,
  KARL CANRIGHT.